United States Patent
Dutt et al.

(10) Patent No.: US 10,809,592 B2
(45) Date of Patent: Oct. 20, 2020

(54) METHODS AND APPARATUS FOR PRODUCING HIGHLY TUNABLE SQUEEZED LIGHT

(71) Applicant: Xanadu Quantum Technologies Inc., Toronto (CA)

(72) Inventors: Avik Dutt, Santa Clara, CA (US); Zachary Vernon, Toronto (CA); Christian Weedbrook, Toronto (CA)

(73) Assignee: Xanadu Quantum Technologies Inc., Toronto (CA)

( * ) Notice: Subject to any disclaimer, the term of this patent is extended or adjusted under 35 U.S.C. 154(b) by 87 days.

(21) Appl. No.: 16/104,424

(22) Filed: Aug. 17, 2018

(65) Prior Publication Data
US 2019/0056632 A1    Feb. 21, 2019

Related U.S. Application Data

(60) Provisional application No. 62/547,324, filed on Aug. 18, 2017.

(51) Int. Cl.
| | |
|---|---|
| *G02F 1/225* | (2006.01) |
| *G02F 1/365* | (2006.01) |
| *G02F 1/313* | (2006.01) |
| *G02F 1/21* | (2006.01) |

(52) U.S. Cl.
CPC .............. *G02F 1/225* (2013.01); *G02F 1/313* (2013.01); *G02F 1/365* (2013.01); *G02F 2001/212* (2013.01)

(58) Field of Classification Search
CPC ........................... G02F 1/225; G02F 2001/212
See application file for complete search history.

(56) References Cited

U.S. PATENT DOCUMENTS

| | | | |
|---|---|---|---|
| 8,655,114 B2 | 2/2014 | Popovic | |
| 9,235,101 B2 | 1/2016 | Silverstone et al. | |
| 2011/0032532 A1 | 2/2011 | Hirano et al. | |
| 2018/0335570 A1* | 11/2018 | Fanto | ...................... G02F 1/225 |

OTHER PUBLICATIONS

Bergman, K., "Quantum Noise Reduction with Pulsed Light in Optical Fibers," Doctoral Thesis, 1994, 144 pages.
(Continued)

*Primary Examiner* — Sung H Pak
*Assistant Examiner* — Hoang Q Tran
(74) *Attorney, Agent, or Firm* — Cooley LLP

(57) ABSTRACT

An apparatus for producing squeezed light includes a substrate and a first beam splitter integrated onto the substrate. The apparatus also includes a Mach-Zehnder interferometer integrated onto the substrate. The Mach-Zehnder interferometer has a first input coupled to a first output of the first beam splitter and a first output coupled to a second output of the first beam splitter. The apparatus also includes a waveguide integrated onto the substrate and connecting a second input of the Mach-Zehnder interferometer to a second output of the Mach-Zehnder interferometer. The waveguide and the Mach-Zehnder interferometer form a ring resonator. The ring resonator can also be replaced by a waveguide section, including, for example, a spiral waveguide.

15 Claims, 7 Drawing Sheets

(56) References Cited

OTHER PUBLICATIONS

Dutt, A. et al., "On-Chip Optical Squeezing," Physical Review Applied 3, 044005 (2015), 7 pages; doi:10.1103/PhysRevApplied.3.044005.
Dutt, A. et al., "Tunable squeezing using coupled ring resonators on a silicon nitride chip," Optics Letters, 41(2):223-226 (2016).
Hoff, U. B. et al., "Integrated source of broadband quadrature squeezed light," Optics Express, 23(9)(2015), 7 pages; doi:10.1364/OE.23.012013.
Meissner, M. et al., "All-fibre source of amplitude squeezed light pulses," J. Opt. B: Quantum Semiclass. Opt., 6:S652-S657 (2004).
Shirasaki, M. & Haus, H. A., "Squeezing of pulses in a nonlinear interferometer," J. Opt. Soc. Am. B, 7(1):30-34 (1990).
Tison, C. C. et al., "The Path to Increasing the Coincidence Efficiency of Integrated Photon Sources," arXiv:1703.08368v1 (2017), 6 pages.
Barbarossa, G. et al., "Theoretical Analysis of Triple-Coupler Ring-Based Optical Guided-Wave Resonator," Journal of Lightwave Technology, 13(2):148-157 (1995).
Liu, F. et al., "Squeezing-enhanced fiber Mach-Zender interferometer for low-frequency phase measurement," Appl. Phys. Lett., 110, 021106 (2017), 6 pages; doi: 10.1063/1.4973895.
Terrel, M. et al., "Ring-coupled Mach-Zehnder interferometer optimized for sensing," Applied Optics, 48(26):4874-4879 (2009).
Extended European Search Report dated Jan. 15, 2019 for European Application No. 18189825.5, 11 pages.

\* cited by examiner

METHODS AND APPARATUS FOR PRODUCING HIGHLY TUNABLE SQUEEZED LIGHT

CROSS-REFERENCE TO RELATED APPLICATION

This application claims priority to U.S. Application No. 62/547,324, filed Aug. 18, 2017, entitled "METHODS AND APPARATUS FOR PRODUCING HIGHLY TUNABLE SQUEEZED LIGHT," which is hereby incorporated herein by reference in its entirety.

BACKGROUND

Squeezed states of light are optical beams in which the degree of quantum fluctuations present have been suppressed to a level below that of ordinary coherent light. This reduction in quantum noise usually occurs along a particular measurement quadrature and comes at the expense of increased quantum noise along the conjugate quadrature, in keeping with the Heisenberg uncertainty principle. Squeezed states can be used for quantum metrology, continuous-variable (CV) quantum information processing (QIP), and quantum simulation. Generating strongly squeezed light in a compact, integrated, chip-based device with high efficiency and purity can be useful in constructing scalable quantum photonic devices. For many CV QIP applications, a high degree of control over the amount of squeezing is beneficial. Furthermore, it is often desirable to displace the generated squeezed state in phase space by an amount independent of the squeezing level.

SUMMARY

Some embodiments of described herein include an apparatus for producing squeezed light. In some embodiments, an apparatus includes a first beam splitter (e.g., a beam splitter that is reconfigurable and/or has a 50/50 splitting ratio), a Mach-Zehnder interferometer, and a waveguide integrated onto a substrate. The Mach-Zehnder interferometer has a first input coupled to a first output of the first reconfigurable beam splitter and a first output coupled to a second output of the first reconfigurable beam splitter. And the waveguide connects a second input of the Mach-Zehnder interferometer to a second output of the Mach-Zehnder interferometer. Together, the waveguide and the Mach-Zehnder interferometer forming a ring resonator.

The apparatus may also include a phase shifter, disposed in an arm of the Mach-Zehnder interferometer, to adjust a coupling strength of the Mach-Zehnder interferometer into the ring resonator. And it can include a second beam splitter integrated onto the substrate with a first input coupled to a second input of the first beam splitter. The second beam splitter may have a splitting ratio of approximately 99/1.

In some embodiments, an apparatus for producing squeezed light includes a substrate and a first beam splitter integrated onto the substrate. The first beam splitter has a first output and a second output. The light source also includes a ring resonator in optical communication with the first beam splitter and a tuning element in optical communication with the first beam splitter and the ring resonator. The tuning element is configured to change a coupling strength of the ring resonator. The tuning element is further configured to transmit optical signals between the first beam splitter and the ring resonator.

In some embodiments, an apparatus for producing a squeezed state of light includes a substrate and a first beam splitter integrated onto the substrate and configured to receive an input optical signal. The first beam splitter is further configured to split the input optical signal into a first portion having a first intensity and a second portion having a second intensity substantially equal to the first intensity. The apparatus also includes a waveguide integrated onto the substrate. The waveguide has an input coupled to a first output of the first beam splitter to receive the first portion of the input optical signal and an output coupled to a second output of the first beam splitter to receive the second portion of the input optical signal. The input and output of the waveguide are further configured to deliver the first portion and the second portion of the input optical signal back to the first beam splitter.

BRIEF DESCRIPTIONS OF THE DRAWINGS

DETAILED DESCRIPTION

Figure 1:
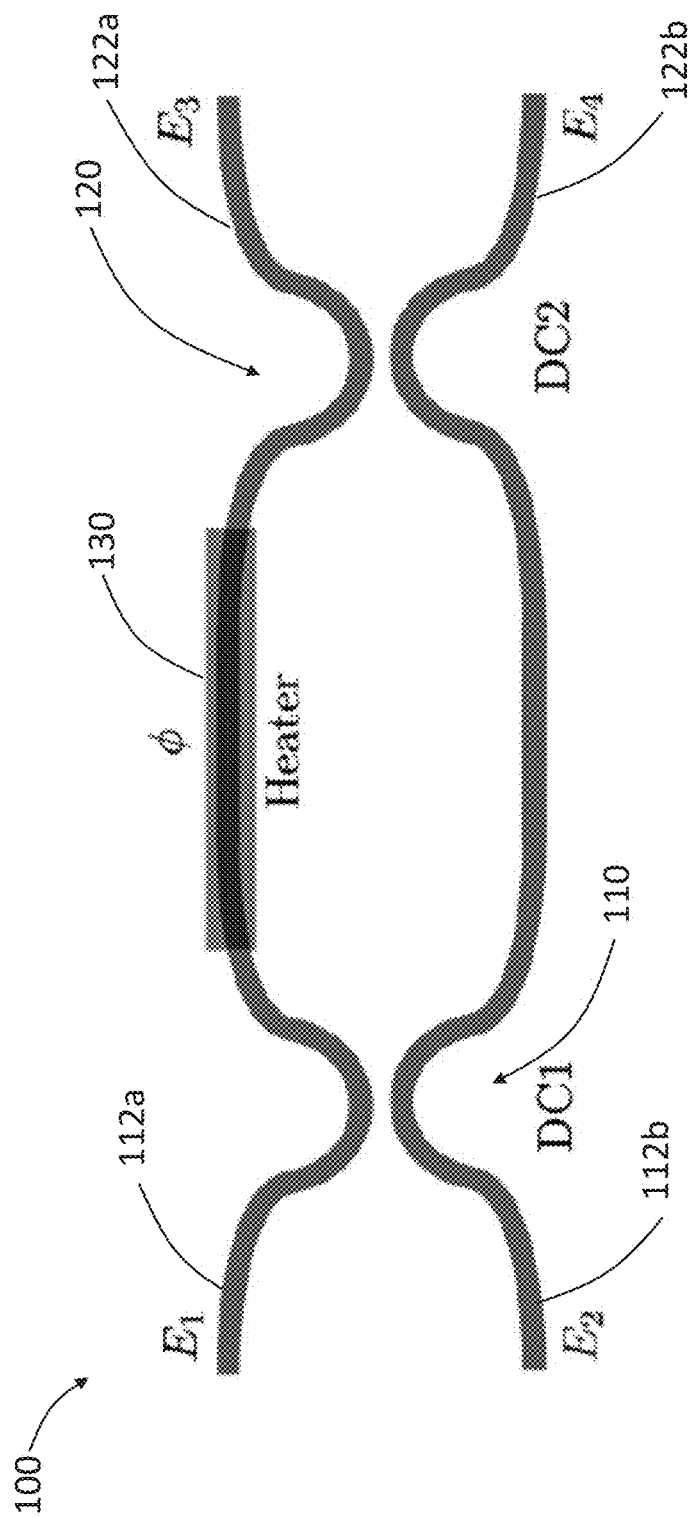
FIG. 1 shows a schematic of a Reconfigurable Beam Splitter (RBS), according to an embodiment.

A photonic chip-based source of squeezed light based on a ring resonator can displace the generated squeezed state in phase space by an amount independent of the squeezing level. Independent control of the phase space displacement and squeezing level makes it possible to use the squeezed displaced states in Gaussian quantum information processing, since virtually all algorithms and protocols relying on squeezed displaced states involve independent tuning of the phase space displacement and squeezing level.

Methods and apparatus described herein employ an interferometric coupling, which allows a highly over-coupled, tunable ring resonator system to replace an array of redundant resonators. Such a tunable ring resonator system can be a useful feature for high-quality resonant squeezed light sources. Rather than making many copies of one ring in the hope that a few of them have the right coupling ratio, this tunable ring resonator system uses one ring with a tunable coupling ratio. In some embodiments, the tunable ring resonator system can be provided, e.g., by the Mach-Zehnder interferometric ring-channel coupler discussed below. Eliminating the redundant resonator arrays saves space on the chip and reduces fabrication costs. Moreover, the use of a single micro-ring resonance to accomplish squeezing obviates the need for sophisticated dispersion engineering of the waveguide modes.

A chip-based squeezed light source can be used as the nonclassical light source for photonic quantum simulation, including variational quantum estimation, and simulation of molecular vibronic spectra. It can also be used as the input for CV quantum teleportation experiments, and to create CV cluster states. Indeed, almost any application of squeezed light can benefit from such a compact, efficient, versatile and tunable squeezed light source.

An integrated squeezed light source can include a number of photonic components, each of which can be fabricated using complementary metal-oxide-semiconductor (CMOS) fabrication processes. These photonic components include, but are not limited to directional couplers (DCs), reconfigurable beam splitters (RBSs), ring resonators (RRs), and Mach-Zehnder interferometric ring-channel couplers (MZIRCCs).

A DC includes two waveguides brought into close proximity of one another over a set propagation length to enable the transfer of light intensity between them. An RBS includes two directional couplers, arranged sequentially to form a Mach-Zehnder interferometer, with a controllable phase delay on one intermediate arm, permitting a tunable extinction and transmission ratio through each port (see, e.g., FIG. 1 below). This component thus behaves as a beam splitter with configurable transmission and reflection ratios. A RR can be implemented as a waveguide wrapped around on itself, leading to resonant enhancement of nonlinear optical processes within the ring waveguide. And an MZIRCC can be implemented as an RBS-based coupler between a waveguide and a ring resonator, permitting wavelength-dependent tunability of the coupling strength between a waveguide and ring resonator (see, e.g., FIG. 2 below). Without being bound by any particular theory or mode of operation, the coupling strength used herein refers to the fraction of light that is coupled between the subsystems (e.g., channel waveguide and ring resonator waveguide) in a single pass (i.e. before buildup in the resonator).

FIG. 1 shows a schematic of a Reconfigurable Beam Splitter (RBS) 100 including a first directional coupler (DC1) 110 and a second direction coupler (DC2) 120 placed sequentially, with the relative optical phase $\phi$ between the intervening waveguide segments controlled thermo-optically by the current through a microheater 130 (shaded overlay). Other means of controlling this phase, such as electro-optic phase shifters, can also be used. The RBS 100 also includes two input ports 112a and 112b, as well as two output ports 122a and 122b. The architecture shown in FIG. 1 can realize an effective Mach-Zehnder interferometer with tunable transmission between the input fields ($E_1$, $E_2$) and the output fields ($E_3$, $E_4$).

Figure 2:
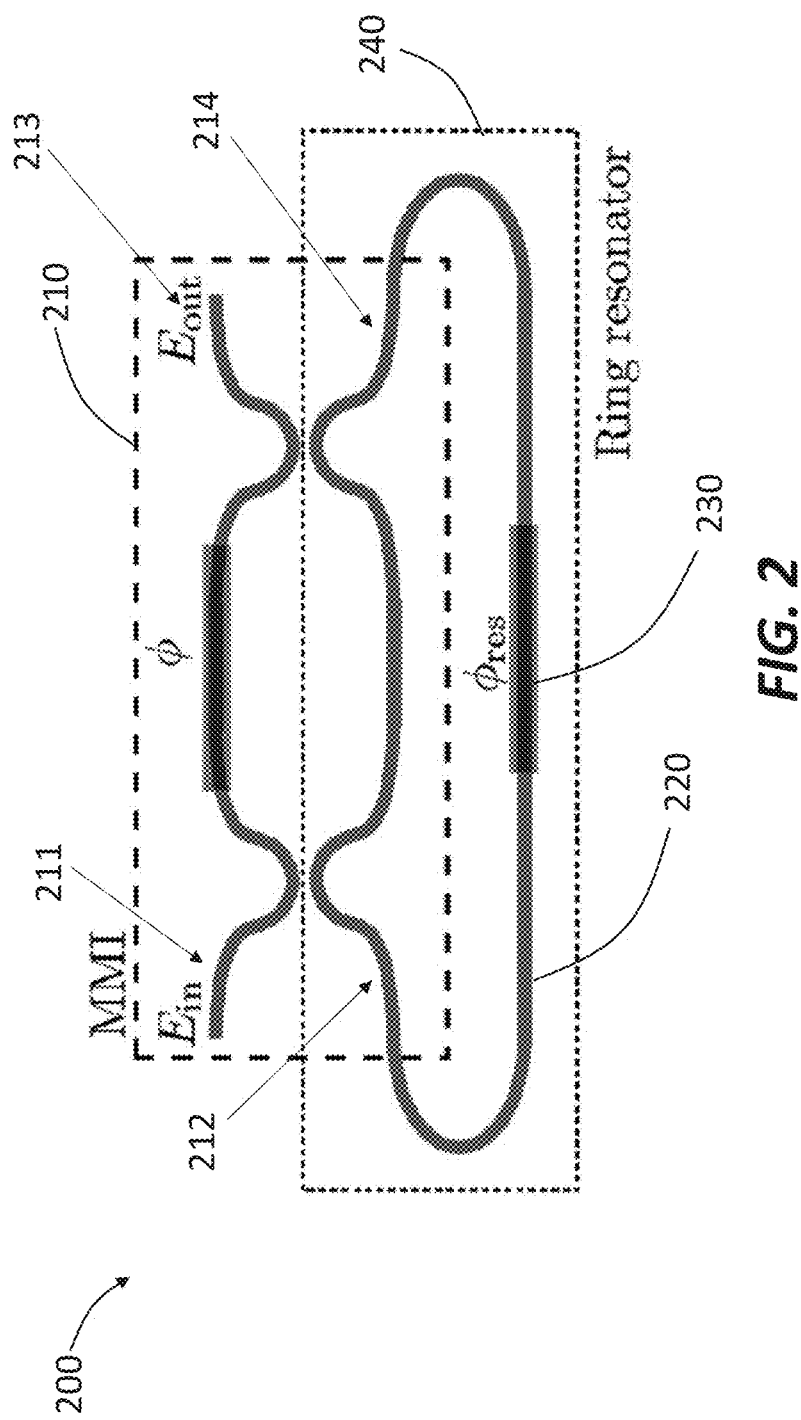
FIG. 2 shows a schematic of a Mach-Zehnder interferometric ring-channel coupler (MZIRCC) suitable for use in a squeezed light source, according to an embodiment.

FIG. 2 shows a schematic of a Mach-Zehnder interferometric ring-channel coupler (MZIRCC) 200. The MZIRCC includes an RBS 210 having one output waveguide 214 fed back into one input waveguide 212. The RBS 210 can be substantially similar to the RBS 100 shown in FIG. 1 and described above. The feedback is achieved by a waveguide 220 and a phase shifter 230 operably coupled to the waveguide. The input waveguide 212, the waveguide 220, and the output waveguide 214 therefore form a ring resonator 240 coupled to an interferometer (i.e., the RBS 210) with tunable phase difference $\phi$ thermo-optically controlled by the microheater current. This current tunes the effective coupling strength between the input/output channels (211 and 213, respectively, in FIG. 2) and the ring resonator 240. The phase shifter 230 (e.g., a microheater) mounted on a segment of the ring resonator 240 can provide phase $\phi_{res}$ per round trip. Adjusting the electrical current through the phase shifter 230 can therefore change the effective optical length of the ring resonator 240, allowing the resonance frequencies and free spectral range of the ring resonator 240 to be fine-tuned.

Figure 3A:
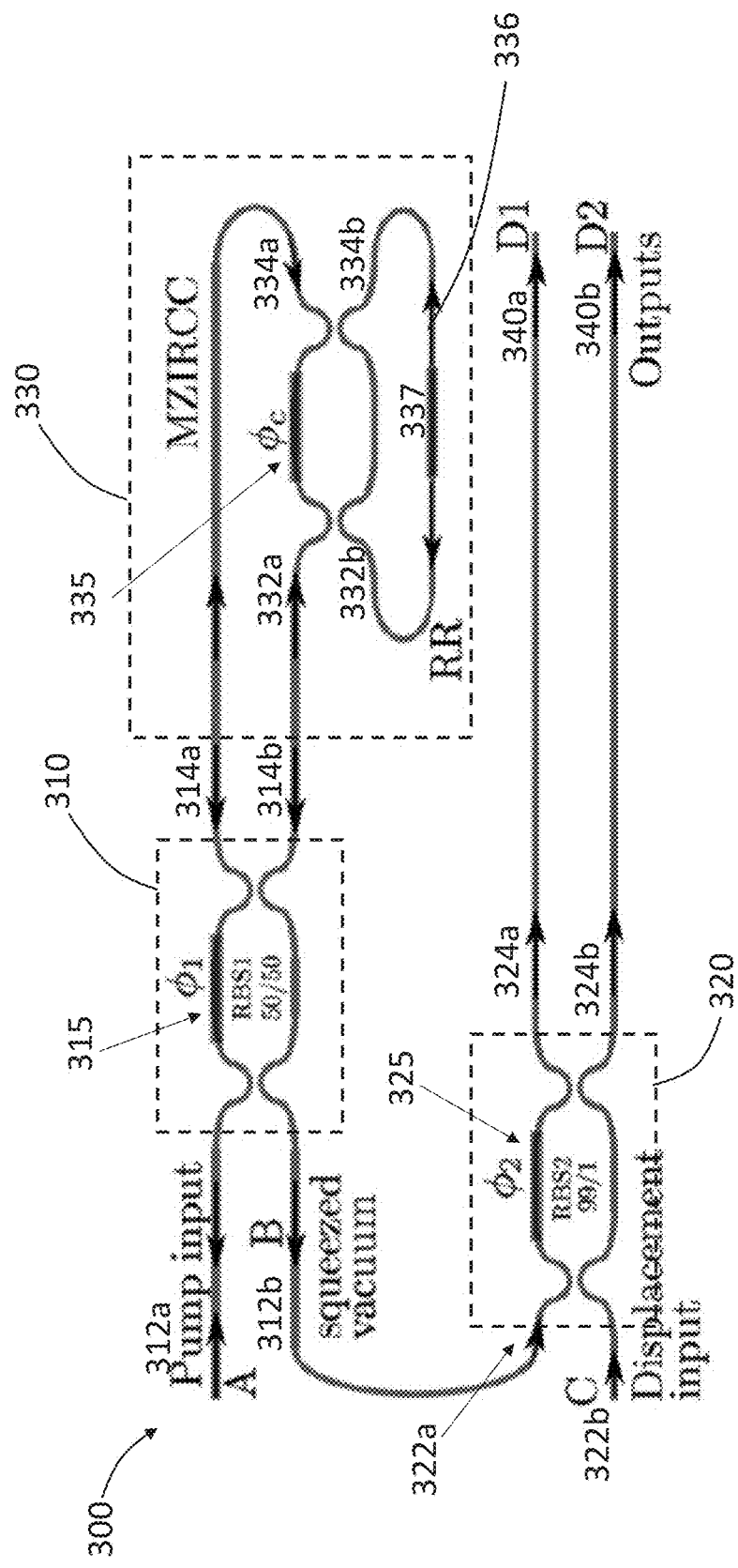
FIG. 3A shows a schematic of an integrated squeezed light source including two RBSs and an MZIRCC, according to an embodiment.
Figure 3B:
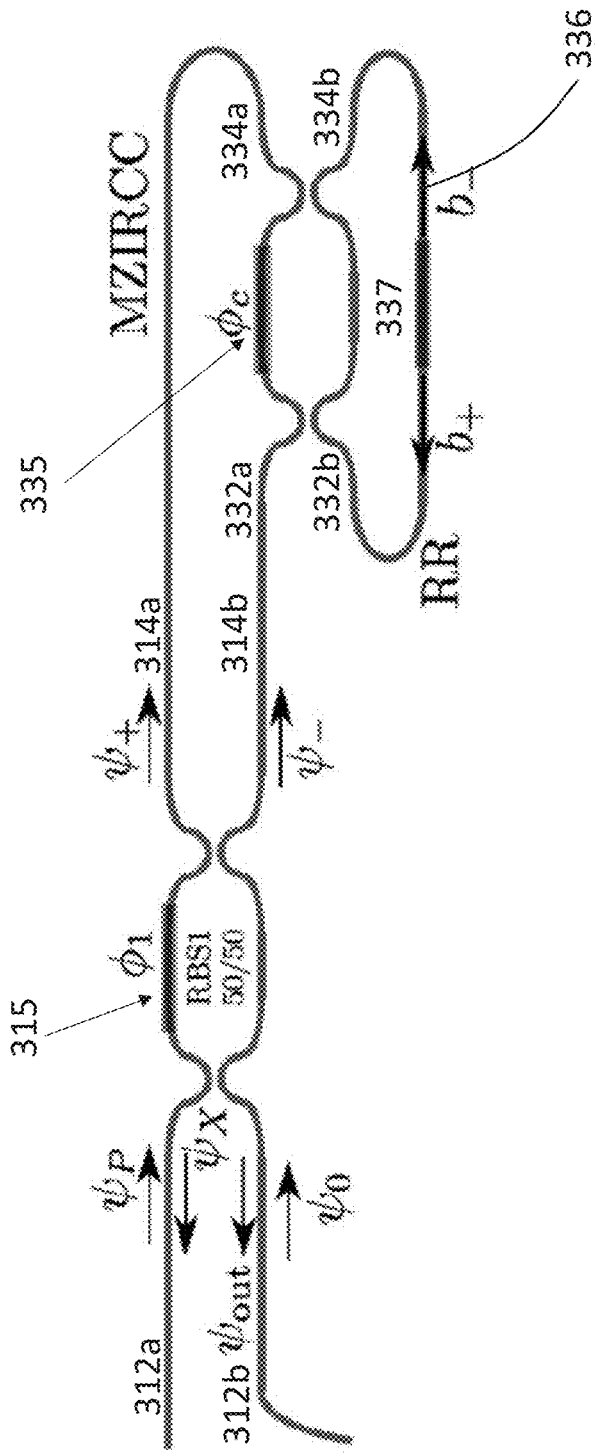
FIG. 3B shows a schematic of a squeezer portion of the integrated squeezed light source shown in FIG. 3A with the field operators labelled, according to an embodiment.

FIG. 3A is a schematic of an integrated squeezed light source 300, and FIG. 3B shows a squeezer portion of the integrated squeezed light source 300 shown in FIG. 3A with the field operators labelled. In some embodiments, the entire light source 300 can be fabricated on a common substrate (also referred to as a chip). In some embodiments, at least a portion of the light source 300 is fabricated on a common substrate and the remaining portions can be fabricated one or more different substrates.

As shown in FIG. 3A, the squeezed light source 300 includes a first RBS 310 (labelled as RBS1), with a first phase shifter 315, which controls the coupling ratio of the first RBS 310. The first RBS 310 also includes two inputs 312a and 312b and two outputs 314a and 314b. The first input 312a of the first RBS 310 is coupled to a pump light source (not shown), such as a pump laser. In some embodiments, the pump laser can be integrated onto or coupled to the chip. The second input 312b of the first RIBS 310 is coupled to one input of a second RBS 320 (labelled as RBS2). The second RBS 320 includes a second phase shifter 325, which controls the coupling ratio of the second RBS 320. The second RBS 320 also includes two inputs 322a and 322b and two outputs 324a and 324b. Although FIG. 3A illustrates that the first RBS 310 and the second RIBS 320 are reconfigurable, non-reconfigurable beam splitters can also be used in place of one or both of the reconfigurable beam splitters.

The light source 300 also includes an MZIRCC 330, which has two inputs 332a and 332b and two outputs 334a and 334b. The second output 314b of the first RBS 310 is coupled to the first input 332a of the MZIRCC 330, which includes a third phase shifter 335. The first output 314a of the first RBS 310 is coupled to the first output 334a of the MZIRCC 330. In addition, the second input 332b of the MZIRCC 330 and the second output 334b are coupled together by a waveguide 336 to form a RR. A phase shifter 337 is operably coupled to the waveguide 336. This coupling arrangement causes light to propagate bi-directionally through the RR (e.g., as in a Sagnac interferometer).

The light source 300 further includes two output ports 340a and 340b. In some embodiments, the output 324a and 324b of the second RBS 320 can be used as the ports 340a and 340b of the entire light source 300. In some embodiments, the output ports 340a and 340b of the light source 300 can be separate components (but optically coupled to the outputs 324a and 324b, respectively, of the second RBS 320).

FIGS. 3A and 3B show that the coupling strength of the RR is adjusted using a Mach-Zehnder interferometer (MZI). In practice, any other suitable means to adjust the coupling strength of the RR can also be used. In some embodiments, the coupling strength can be adjusted via thermal tuning of the coupling region. In some embodiments, the coupling strength can be adjusted via coupled resonator-mediated coupling, tunable by shifting the resonance position of the mediating resonator. In some embodiments, the coupling strength can be adjusted via strain tuning in the coupling region, or tuning by other mechanical means.

Squeezing of the both clockwise- and counterclockwise-circulating modes in the RR is achieved via self-phase modulation arising from the third-order nonlinear optical response of the ring resonator medium. The coherent carrier pump light coupled back (e.g. via 314a and 314b) through the first RBS 310 undergoes destructive interference at channel B (i.e. the second input 312b of the first RBS 310) and is extinguished, so that only quadrature squeezed vacuum emerges from that channel B. The squeezed vacuum from channel B is mixed with coherent light from displacement input channel C (i.e., input 322b of the second RBS 320), resulting in displaced squeezed light at the outputs D1 and D2 (e.g., outputs 324a and 324b of the second RBS 320).

The squeezed light source shown in FIGS. 3A and 3B can be fabricated on an integrated photonic chip, with the waveguide cores of the components constructed from a material having a suitable third-order nonlinear optical response (e.g., silicon nitride). Put differently, the waveguide cores provide high third-order nonlinearity that is transparent up to three-photon-absorption at the operational wavelength(s). The waveguide material can have little to no linear or two-photon absorption at the relevant wavelengths (e.g., the waveguide material should have a bandgap greater than twice the photon energy at the operational wavelength). The waveguides can be designed such that optical modes propagating within the waveguides are well confined to the region of highest nonlinearity. For operation at 1550 nm, for example, the squeezed light source may be formed of single-mode waveguides with silicon nitride cores and silicon oxide claddings on a silicon chip forming the basic substrate. Other suitable materials include, for example, aluminum nitride and Hydex.

The operation of the squeezed light source shown in FIGS. 3A and 3B can be summarized as follows. A coherent pump injected an optical signal into the input channel A (i.e. first input 312a) is incident on the first RBS 310, with phase $\phi_1$ tuned before operation. The optical signal is then monitored and stabilized during operation to obtain a 50% transmission ratio through each output port 314a and 314b of the first RBS 310, i.e., the two output signals at 314a and 314b have substantially the same intensity (or power). The optical signal thereby propagates both clockwise and counterclockwise in the MZIRCC 330 with equal intensity in either orientation.

The MZIRCC 330 couples the optical signal to the RR in both directions, thereby exciting both the clockwise- and counterclockwise-circulating modes therein. The circulating intensities of the pump modes for both directions (i.e. clockwise- and counterclockwise-circulating pump modes) are also substantially equal.

The phase $\phi_c$ in the MZIRCC 330 controls the extrinsic quality factor of the RR mode, which can directly impact the resonance linewidth and coupling condition of both the clockwise- and counterclockwise-circulating pump modes in the RR. Possible coupling conditions include, for example, under coupling, over coupling, or critical coupling. The phase depends on the various path lengths, which may be difficult to control precisely during fabrication. It can be adjusted as desired during device characterization, then stabilized and monitored during the operation. As discussed below, the ability to tune this coupling condition has a marked impact on the quality of the squeezed light for the output of an RR-based squeezer. The squeezing bandwidth is also tuned by $\phi_c$.

The light emerging from the RR is incident on both output ports 314a and 314b of the first RBS 310 (i.e., from the MZIRCC 330 on the right side of FIG. 3A towards the first RBS 310 on the left side of FIG. 3A). Since the optical paths for both directions (i.e. directions within the Sagnac loop) are automatically balanced, the coherent pump carrier portion of the optical signal is extinguished at port B (i.e. 312b). Furthermore, since the squeezing angle of the generated squeezed light from each direction is balanced, no entanglement is present between the outgoing light in port B (i.e., 312b) and the outgoing light to port A (i.e., 312a), i.e., the output of B (i.e. 312b) is a pure squeezed vacuum state.

The squeezed vacuum from port 312b is mixed with coherent light from the input 322b of the second RBS 320. The phase (2 is tuned before operation, then set and stabilized to obtain a very high transmission ratio between channels C (i.e. 322b) and channel D1 (i.e. 324a or 340a). In some embodiments, the transmission ratio can be about 99% or higher, so that very little squeezed light is lost to port D2 (i.e. 324b or 340b), the output of which is discarded. The exact coupling ratio depends on the available power and how much power can be coupled into port C (i.e. 322b). The resultant light exiting output port 324b is a displaced squeezed state. Since the degree of displacement is controlled by the input to the port 322b, which is independent of the amount of squeezing, the degree of displacement and squeezing are independently tunable. This tunability is provided by a separate displacer stage, since the nonlinear process that generates the squeezed light in the squeezer provides a degree of squeezing that is directly related to the initial displacement of the pump light. The addition of a separate displacer component (e.g., second RBS 320) decouples the displacement and squeezing operations.

Without being bound by any particular theory, the operation of the squeezing device shown in FIG. 3B can be understood by analyzing the relevant optical field operators within the system. Since the squeezing device usually operates on very narrowband light (e.g., 10 MHz to 10 GHz), in the channel segments (i.e., everywhere in the squeezing device except within the RR) it is sufficient to consider photon field operators $\psi^{(z)}$, defined such that the commutators $$[\psi(z), \psi(z')] = 0,$$

$$[\psi(z), \psi^\dagger(z')] = \delta(z-z') \qquad (1)$$

are satisfied and $$j(z) = v_g \langle \psi^\dagger(z) \psi(z) \rangle \qquad (2)$$

represents the mean photon flux at z in the field described by $\psi(z)$, with $v_g$ the group velocity; dispersion is assumed to be sufficiently small across the bandwidths considered that this group velocity can essentially be considered constant across all frequencies of interest. The dispersion should be small enough that the group velocity is (substantially) constant over the operational bandwidth, which be made narrow enough to achieve the desired dispersion. The various fields propagating in the full device can be modeled by these mathematical objects (e.g., $\psi(z)$).

It is instructive to begin with the squeezer segment of the device. As illustrated FIG. 3B, at the input 312a to the first RBS 310, the field into which the pump is injected is described by field operator $\psi_p$; the other (vacuum) input 312b to the first RBS 310 is described by field operator $\psi_0$. The fields immediately to the right of the first RBS 310 are then given by $$\psi_+ = \frac{1}{\sqrt{2}}(\psi_P + \psi_0), \qquad (3)$$

$$\psi_- = \frac{1}{\sqrt{2}}(-\psi_P + \psi_0).$$

These fields propagate through the MZIRCC 330 to the coupling points at the RR. Though two coupling points exist, the coupling to the RR provided by the MZIRCC 330 can be modeled as an effective coupling at a single point with tunable coupling strength determined by phase $\phi_c$ controlled by the microheater current $I_c$. The input fields $\psi_{+<}$ ($\psi_{-<}$) and output fields $\psi_{+>}$ ($\psi_{->}$) couple to the counterclockwise (clockwise)-circulating RR mode $b_+$ ($b_-$). These ring modes satisfy $$[b_\pm, b_0] = 0,$$

$$[b_\pm, b_0^\dagger] = 0. \qquad (4)$$

Standard cavity input-output theory can be used to calculate the intraresonator dynamics, from which squeezing occurs due to the self-phase modulation interaction arising from the third-order nonlinear optical response of the ring medium. Since the entire structure has a nonlinear-optical response, squeezing can occur in every waveguide portion. But the massive field enhancement in the RR makes it a good approximation to neglect nonlinear effects elsewhere. Ultimately the result of such a calculation yields expressions for the time-dependent Heisenberg-picture output fields in terms of the input fields:

$$\psi_{\pm>}(t) = \int dt' [f_\pm(t,t')\psi_{\pm<}(t') + g_\pm(t,t')\psi_{\pm<}^\dagger(t')] + N(t), \qquad (5)$$

where $f_\pm(t,t')$ are the calculated temporal response functions. The operator $N(t)$ contains all contributions from scattering losses in the RR, which can be modeled by the inclusion of fictitious extra input/output channels that couple to the RR. The output fields $\psi_{\pm>}$ can then be propagated to the first RBS 310, where they are transformed to fields $\psi_{out}$ and $\psi_x$ via the same relation as Equation (3). The statistics of the field operator $\psi_{out}$ reveal quadrature squeezing across the bandwidth of the ring resonance used; the displacement operation then produces a final device output corresponding to displaced squeezed vacuum.

The degree and quality of the squeezed output depends on the coupling ratio $\alpha$, $$\alpha = \frac{Q}{Q_{ext}}, \qquad (6)$$

where $Q$ is the full loaded quality factor of the RR and $Q_{ext}$ is the extrinsic quality factor associated with the coupling to the input and output channels. This ratio can be understood as the probability that a photon in the RR can be collected in the relevant output channel, rather than be lost to scattering. Thus when $\alpha$ is close to unity, almost all the light in the resonator is collected, directly mitigating the corruption of the squeezed light output by the contribution from the noise fields $N(t)$. Since $Q_{ext}$ is directly related to the effective coupling strength given by the MZIRCC 330, which is in turn controllable by the microheater current $I_c$. The coupling ratio $\alpha$ is thus a function of this current, $\alpha = \alpha(I_c)$. This obviates the need for fabricating large sequences of ring resonators with varying coupling gaps in order to identify those with the desired highly over-coupled condition ($\alpha \to 1$); instead, with the MZIRCC 330, a single resonator with tunable coupling can be used.

Figure 4:
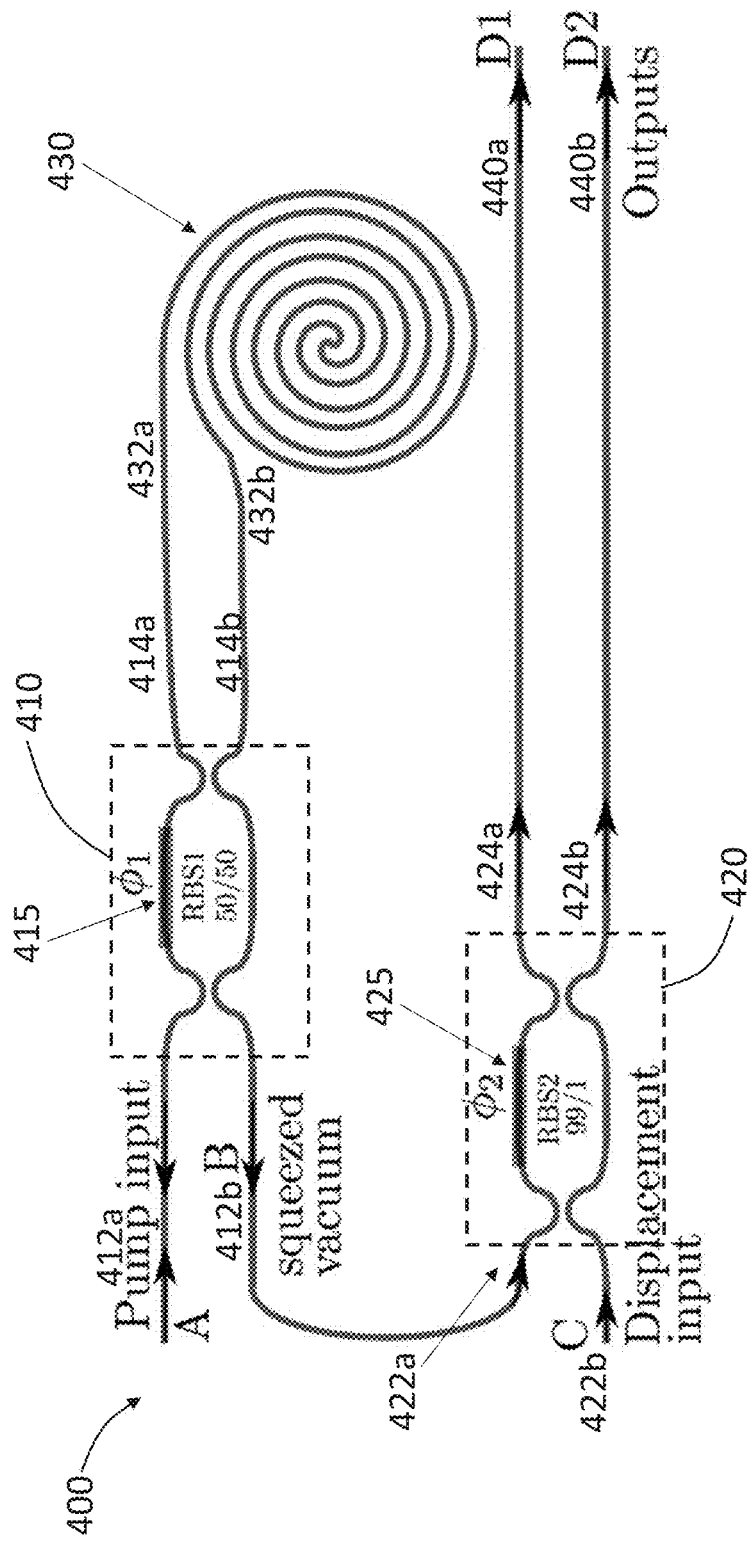
FIG. 4 shows a schematic of an apparatus including a spiral waveguide for generating squeezed light states, according to an embodiment.

FIG. 4 shows a schematic of a light source 400 including a spiral waveguide for generating squeezed state of light. The light source 400 includes a first RBS 410 that further includes two inputs 412a and 412b as well as two output 414a and 414b. A phase shifter 415 is operably coupled to one arm of the first RBS 410 to control the splitting ratio of the first RBS 410. Optical signals delivered by the first RBS 410 are sent to a waveguide 430 (e.g., a spiral waveguide), where the optical signals undergo nonlinear modulations (e.g., third-order nonlinear modulation). The waveguide 430 includes an input 432a coupled to the first output 414a of the first RBS 410 and an output 432b coupled to the second output 414b of the first RBS 410.

The waveguide 430 can have sufficient nonlinearity and length to allow for squeezed light generation when pumped by an optical pulse train of suitable duration and peak power. In some embodiments, the waveguide 430 is spiral as illustrated in FIG. 4. In some embodiments, the waveguide 430 can be straight (or linear). In some embodiments, the waveguide 430 can include a bent waveguide. The tunability of the first RBS 410 is employed to control the magnitude and phase angle of the generated squeezed light. The waveguide 430 may also be engineered (or configured) to tailor the bandwidth and temporal mode structure of the generated squeezed light.

Optical signals propagating in the waveguide 430 in both directions, i.e. clockwise and counterclockwise, and travel back to the first RBS 410 via the two outputs 414a and 414b. The first RBS 410 then delivers the generated squeezed light, via the input 412b, to a second RBS 420. The second RBS 420 includes a first input 422a to receive the squeezed light from the input 412b of the first RBS 410. The second RBS 420 also includes a second input 422b to receive a displacement input so as to generate a displaced squeezed light, which is transmitted out of the second RBS 420 via one or both outputs 424a and 424b. A phase shifter 425 is operably coupled to one arm of the second RBS 420 to control the splitting ratio of the second RBS 420.

The light source 400 further includes two output ports 440a and 440b. In some embodiments, the output 424a and 424b of the second RBS 420 can be used as the ports 440a and 440b of the entire light source 400. In some embodiments, the output ports 440a and 440b of the light source 400 can be separate components (but optically coupled to the output 424a and 424b, respectively, of the second RBS 420).

Figure 5:
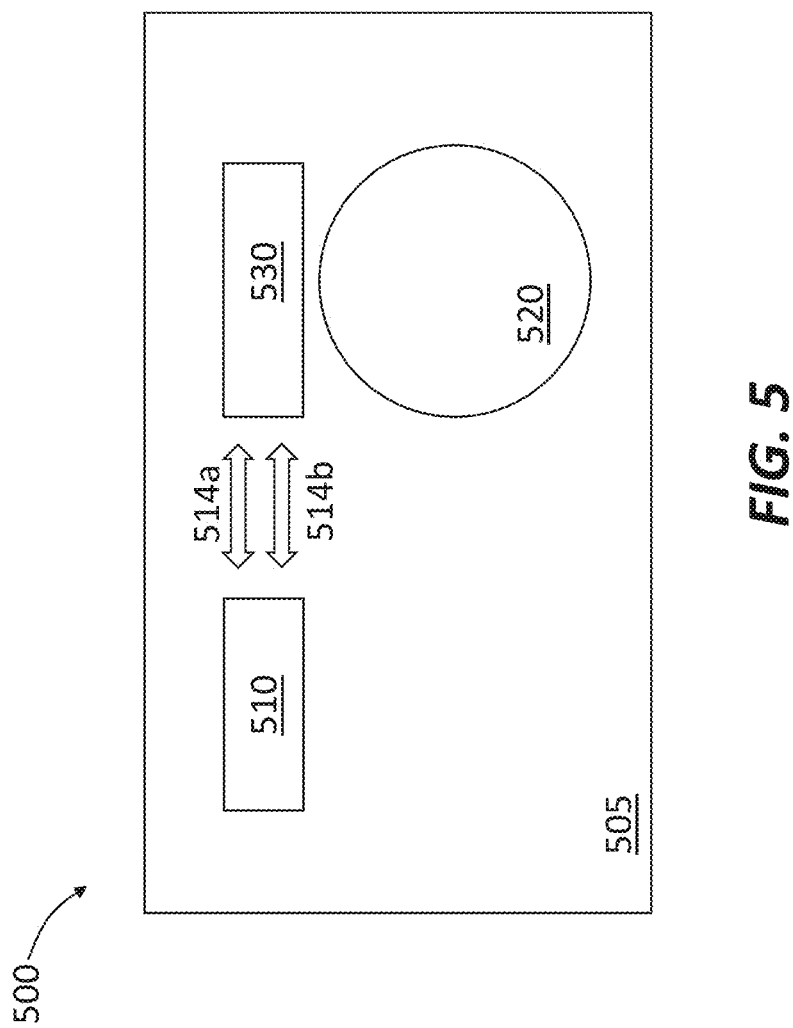
FIG. 5 shows a block diagram of an apparatus for generating squeezed light, according to an embodiment.

FIG. 5 shows a schematic of an apparatus 500 for generating squeezed light. The apparatus 500 includes a substrate 505 and a first beam splitter 510 integrated onto the substrate 505. The first beam splitter has a first output 514a and a second output 514b. The apparatus 500 also includes a ring resonator 520, in optical communication with the first beam splitter 510, to circulate light out of the first beam splitter 510. The optical coupling between the first beam splitter 510 and the ring resonator 520 is achieved via a tuning element 530. The tuning element 530 is configured to change the coupling strength of the ring resonator 520. In addition, the tuning element 530 is further configured as a bidirectional link between the first beam splitter 510 and the ring resonator 520, i.e. light can propagate from the first beam splitter 510 to the ring resonator 520 as well as from the ring resonator 520 back to the first beam splitter 510. Therefore, the outputs 514a and 514b can also be used as inputs.

In some embodiments, the tuning element 530 is configured to adjust the coupling strength via thermal tuning of the coupling region. In some embodiments, the tuning element is configured to adjust the coupling strength via coupled resonator-mediated coupling, tunable by shifting the resonance position of the mediating resonator. In some embodiments, the tuning element is configured to adjust the coupling strength via strain tuning in the coupling region, or tuning by other mechanical means.

In some embodiments, the tuning element 520 is configured to deliver light into the ring resonator 520 along both clockwise and counterclockwise direction. In some embodiments, light propagating along the clockwise and counter-clockwise directions within the ring resonator 520 can have substantially the same intensity. The squeezing of light can be achieved via similar mechanisms described above.

Although a circular shape is illustrated in FIG. 5, the ring resonator 520 can have any other suitable shapes, such as square, rectangular, and elliptical. In some embodiments, the ring resonator 520 can be a semiconductor ring resonator fabricated on the substrate 505. In some other embodiments, the ring resonator 520 can include a fiber ring disposed on the substrate 505.

Figure 6:
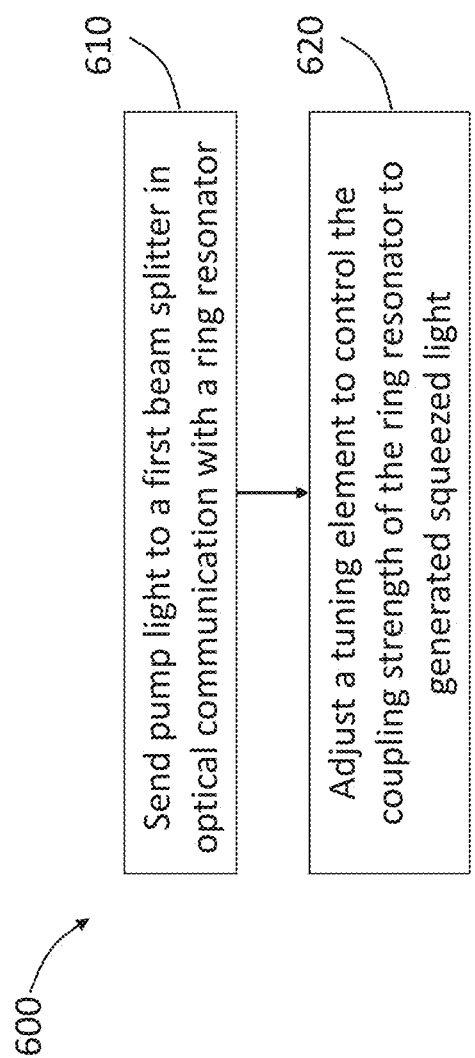
FIG. 6 illustrates a method of generating squeezed light, according to an embodiment.

FIG. 6 illustrates a method 600 of generating squeezed light, according to an embodiment. The method 600 can be implemented using any of the apparatus described herein. In the method 600, pump light is delivered to a first beam splitter in optical communication with a ring resonator, at 610. The coupling strength of the ring resonator is controlled by a tuning element, which is also configured to couple the pump light out of the first beam splitter into the ring resonator, at 620. The pump light propagates along both clockwise and counterclockwise directions within the ring resonator. The tuning element is further configured to couple the pump light within the ring resonator back to the first beam splitter, such that the pump light along opposite directions within the ring resonator interferes with each other. The net result is that only quadrature squeezed vacuum emerges from the first beam splitter.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments can be implemented in any of numerous ways. For example, embodiments of designing and making the technology disclosed herein may be implemented using any suitable hardware. Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An apparatus for producing squeezed light, the apparatus comprising:
    a substrate;
    a first beam splitter integrated onto the substrate;
    a Mach-Zehnder interferometer integrated onto the substrate, the Mach-Zehnder interferometer having a first input coupled to a first output of the first beam splitter and a first output coupled to a second output of the first beam splitter; and
    a waveguide integrated onto the substrate and connecting a second input of the Mach-Zehnder interferometer to a second output of the Mach-Zehnder interferometer, the waveguide and the Mach-Zehnder interferometer forming a ring resonator.

2. The apparatus of claim 1, wherein the first beam splitter has a splitting ratio of approximately 50/50.

3. The apparatus of claim 1, wherein the first beam splitter is a first reconfigurable beam splitter.

4. The apparatus of claim 1, further comprising:
    a phase shifter, disposed in an arm of the Mach-Zehnder interferometer, to adjust a coupling strength of the Mach-Zehnder interferometer into the ring resonator.

5. The apparatus of claim 1, further comprising:
    a second beam splitter integrated onto the substrate, the second beam splitter having a first input coupled to a second input of the first beam splitter.

6. The apparatus of claim 1, further comprising:
    a second beam splitter integrated onto the substrate, the second beam splitter having a first input coupled to a second input of the first beam splitter, the second beam splitter having a splitting ratio of approximately 99/1.

7. The apparatus of claim 1, wherein the waveguide is characterized by a bandgap greater than twice a photon energy at an operational wavelength of the apparatus.

8. An apparatus, comprising:
    a substrate;
    a first beam splitter integrated onto the substrate, the first beam splitter having a first output and a second output;
    a ring resonator, in optical communication with the first beam splitter; and
    a tuning element in optical communication with the first beam splitter and the ring resonator, the tuning element configured to change a coupling strength of the ring resonator, the tuning element further configured to transmit optical signals between the first beam splitter and the ring resonator for generating squeezed light.

9. The apparatus of claim 8, wherein the tuning element includes a Mach-Zehnder interferometer integrated onto the substrate, the Mach-Zehnder interferometer having a first input coupled to a first output of the first beam splitter and a first output coupled to a second output of the first beam splitter.

10. The apparatus of claim 8, wherein the tuning element includes a Mach-Zehnder interferometer integrated onto the substrate, the Mach-Zehnder interferometer having a first input coupled to a first output of the first beam splitter and a first output coupled to a second output of the first beam splitter, and the ring resonator includes:
    a waveguide integrated onto the substrate and connecting a second input of the Mach-Zehnder interferometer to a second output of the Mach-Zehnder interferometer.

11. The apparatus of claim 8, wherein the first beam splitter has a splitting ratio of approximately 50/50.

12. The apparatus of claim 8, wherein the first beam splitter is a first reconfigurable beam splitter.

13. The apparatus of claim 8, further comprising:
    a second beam splitter integrated onto the substrate, the second beam splitter having a first input coupled to a second input of the first beam splitter.

14. The apparatus of claim 8, further comprising:
    a second beam splitter integrated onto the substrate, the second beam splitter having a first input coupled to a second input of the first beam splitter, the second beam splitter having a splitting ratio of approximately 99/1.

15. The apparatus of claim 8, wherein the ring resonator is characterized by a bandgap greater than twice a photon energy at an operational wavelength of the apparatus.

* * * * *